(12) United States Patent
Nishizawa et al.

(10) Patent No.: US 7,855,790 B2
(45) Date of Patent: Dec. 21, 2010

(54) DIMENSION MEASURING APPARATUS

(75) Inventors: Norihiko Nishizawa, Suita (JP); Masatoshi Arai, Mitaka (JP); Tomohiro Aoto, Mitaka (JP)

(73) Assignees: Osaka University, Osaka (JP); National University Corporation Nagoya University, Aichi-ken (JP); Tokyo Seimitsu Co., Ltd., Tokyo (JP)

( * ) Notice: Subject to any disclaimer, the term of this patent is extended or adjusted under 35 U.S.C. 154(b) by 143 days.

(21) Appl. No.: 12/389,288

(22) Filed: Feb. 19, 2009

(65) Prior Publication Data

US 2009/0237675 A1    Sep. 24, 2009

(30) Foreign Application Priority Data

Feb. 20, 2008  (JP) .............................. 2008-038151
Dec. 26, 2008  (JP) .............................. 2008-334517

(51) Int. Cl.
*G01B 11/02*   (2006.01)

(52) U.S. Cl. ...................................... 356/497

(58) Field of Classification Search ................ 356/496, 356/497, 511
See application file for complete search history.

(56) References Cited

U.S. PATENT DOCUMENTS 6,813,030 B2 * 11/2004 Tanno ........................ 356/497

2004/0114151 A1 * 6/2004 Tanno et al. ................. 356/497
2005/0041254 A1 * 2/2005 Tsai ............................. 356/496

OTHER PUBLICATIONS

Shiina, et al., "Long-optical-path scanning mechanism for optical coherence tomography", Applied Optics, vol. 42, No. 19, pp. 3795-3799, Jul. 1, 2003.

\* cited by examiner

*Primary Examiner*—Tarifur Chowdhury
*Assistant Examiner*—Jonathan M Hansen
(74) *Attorney, Agent, or Firm*—Christie, Parker & Hale LLP

(57) ABSTRACT

A dimension measuring apparatus includes a light beam splitting element for splitting light emitted from a white light source into measuring light flux and reference light flux, a reference light scanning optics for varying optical path length of the reference light flux, a detector for detecting interference signal produced by the light fluxes, and a controller for determining the surface height of the object from the optical path length of the reference light flux corresponding to maximum value of the interference signal. The reference light scanning optics includes a rotary member, first and second reflective elements disposed to be symmetrical with respect to the rotation axis of the rotary member, and light beam deflecting members that direct the reference light flux to be incident on the first reflective element along the direction parallel and opposite to the incident direction of the reference light flux on the second reflective element.

2 Claims, 2 Drawing Sheets

DIMENSION MEASURING APPARATUS

CROSS-REFERENCE TO RELATED APPLICATION

The Applicant claims the right to priority based on Japanese Patent Application JP 2008-38151, filed on Feb. 20, 2008, and JP2008-334517, filed on Dec. 26, 2008 and the entire contents of JP 2008-38151 and JP2008-334517 are hereby incorporated by reference.

FIELD

The present invention relates to a dimension measuring apparatus for measuring dimensions of an object to be measured, and more particularly to a dimension measuring apparatus that utilizes white light interference to measure surface height of an object to be measured.

BACKGROUND

Conventionally, a method that utilizes principles of white light interference has been proposed for measuring surface height of an object precisely and in a non-contact manner. In such a method, a light beam emitted from a white light source is split into a measurement light flux that is directed to the object to be measured and a reference light flux that is directed to a reference mirror, and after being reflected from the surface of the object and from the reference mirror, respectively, the two light fluxes are combined again into one light flux to be detected. The amplitude of the white light interference fringes becomes maximum when the optical path length of the measurement light flux is equal to the optical path length of the reference light flux. Thus, by moving the reference mirror and measuring the position of the reference mirror when the amplitude of the interference fringe is maximum, and thereby determining the optical path length of the reference light flux, it is possible to determine the surface height of the object to be measured.

White light interference can be observed only if the two light fluxes described above have substantially equal optical path length. Therefore, as the range of dimension to be measured is large, the range of movement of the reference mirror becomes large. Further, as the range of movement is large, the time required for movement of the reference mirror over the entire range becomes long, so that the measurement time required for each point to be measured on the surface of the object becomes long, too. Therefore, in the measuring method that utilizes white light interference, if the surface area of the object to be measured is large and a large number of points have to be measured, a very long time may be required for measurement of the entire object. Thus, a mechanism is disclosed, for example, in Tatsuo Shiina, et al. "Long optical path scanning mechanism for optical coherence tomography", Applied Optics, Vol. 42, No. 19, pp. 3795-3799, 2003, in which a plurality of corner cubes are mounted on a rotary table as reference mirrors, and by rotating the rotary table at high speed and thereby moving the corner cubes at high speed, the optical path length of the reference light can be varied at high speed.

In the mechanism as disclosed in the above publication, however, if the position of the rotation axis of the rotary table is shifted, the optical path length of the reference light flux changes accordingly, and therefore, it is difficult to measure dimensions of an object in high precision.

SUMMARY

In view of the problem described above, it is an object of the present invention to provide a dimension measuring apparatus that measures surface height of an object by using the principle of white light interference and that is capable of measuring the surface height of an object in a short time and in high precision.

In accordance with an embodiment of the present invention, there is provided a dimension measuring apparatus for measuring surface height of an object. The dimension measuring apparatus includes a white light source, a light beam splitting element for splitting the light emitted from the white light source into a measurement light flux having optical path length corresponding to the surface height of the object and a reference light flux, a reference light scanning optics for changing the optical path length of the reference light flux exiting from the light beam splitting element, a detector for detecting interference signal produced when the optical path length of the measurement light flux and the optical path length of the reference light flux are substantially equal to each other and outputting a signal corresponding to the interference signal, and a controller that determines the surface height of the object by measuring the optical path length of the reference light flux corresponding to the maximum value of the interference signal. The reference light scanning optics includes a rotary member, a driver for rotating the rotary member at a predetermined rotational speed, a first and a second reflective elements disposed on the rotary member so that the first and second reflective elements are symmetric with respect to the rotation axis of the rotary member, and light beam deflecting members which, when the reference light flux is incident on one of the first or the second reflective elements, direct the reference light flux such that the reference light flux which is reflected from the one reflective element, is incident on the other of the first or the second reflective elements along a direction parallel to and opposite to the incident direction of the reference light flux on the one reflective element. The reference light scanning optics changes the optical path length of the reference light flux by rotating the rotary member.

In accordance with the present invention, the reference light scanning optics preferably further includes a third and a fourth reflective elements disposed on the rotary member so that the third and fourth reflective element are symmetric with respect to the rotation axis of the rotary member, wherein the reflective elements are disposed at equal interval to each other and at equal distance from the rotation axis of the rotary member, and wherein the light beam deflecting members direct the reference light flux such that, when the reference light is incident on one of the first or second reflective elements, the light beam deflecting members direct the reference light flux which is reflected from the one reflective element, so as to be incident on one of the third or the fourth reflective elements and then to be incident on the other of the third or the fourth reflective elements along a direction parallel to and opposite to the incident direction of the reference light flux on the one of the third or the fourth reflective elements.

BRIEF DESCRIPTION OF THE DRAWINGS

These and other features and advantages of the present invention will be better understood by referring to the following detailed description, taken together with the drawings wherein.

DESCRIPTION OF EMBODIMENTS

An embodiment according to the present invention will be described below with reference to the drawings. However, it should be noted that the present invention is not limited by the description given herein, but embraces the inventions described in the appended claims and their equivalents.

A dimension measuring apparatus for measuring surface height of an object such as a die according to the present invention will be described.

The dimension measuring apparatus according to the present invention splits the light emitted from a white light source into a measurement light flux and a reference light flux by using an optical coupler. The measurement light flux is reflected or scattered from the surface of the object, after that, the measurement light flux is again combined with the reference light flux by an optical coupler into one light beam. A detector detects the light beam. The dimension measuring apparatus determines the surface height of the object by measuring the optical path length of the reference light flux when the amplitude of the fringes of the white light interference produced by the two light fluxes is a maximum. In order to direct the reference light flux exiting from the optical coupler to be again incident on the optical coupler, the dimension measuring apparatus uses a plurality of corner cube prisms disposed on a rotary table so that the corner cube prisms are symmetric to each other with respect to the rotation axis of the rotary table. This measuring apparatus uses these corner cube prisms and fixed mirrors disposed in opposition thereto to compensate for the variation of the optical path length of the reference light flux due to positional shift of the rotation axis and measure the surface height of the object at high speed and in high precision.

Figure 1:
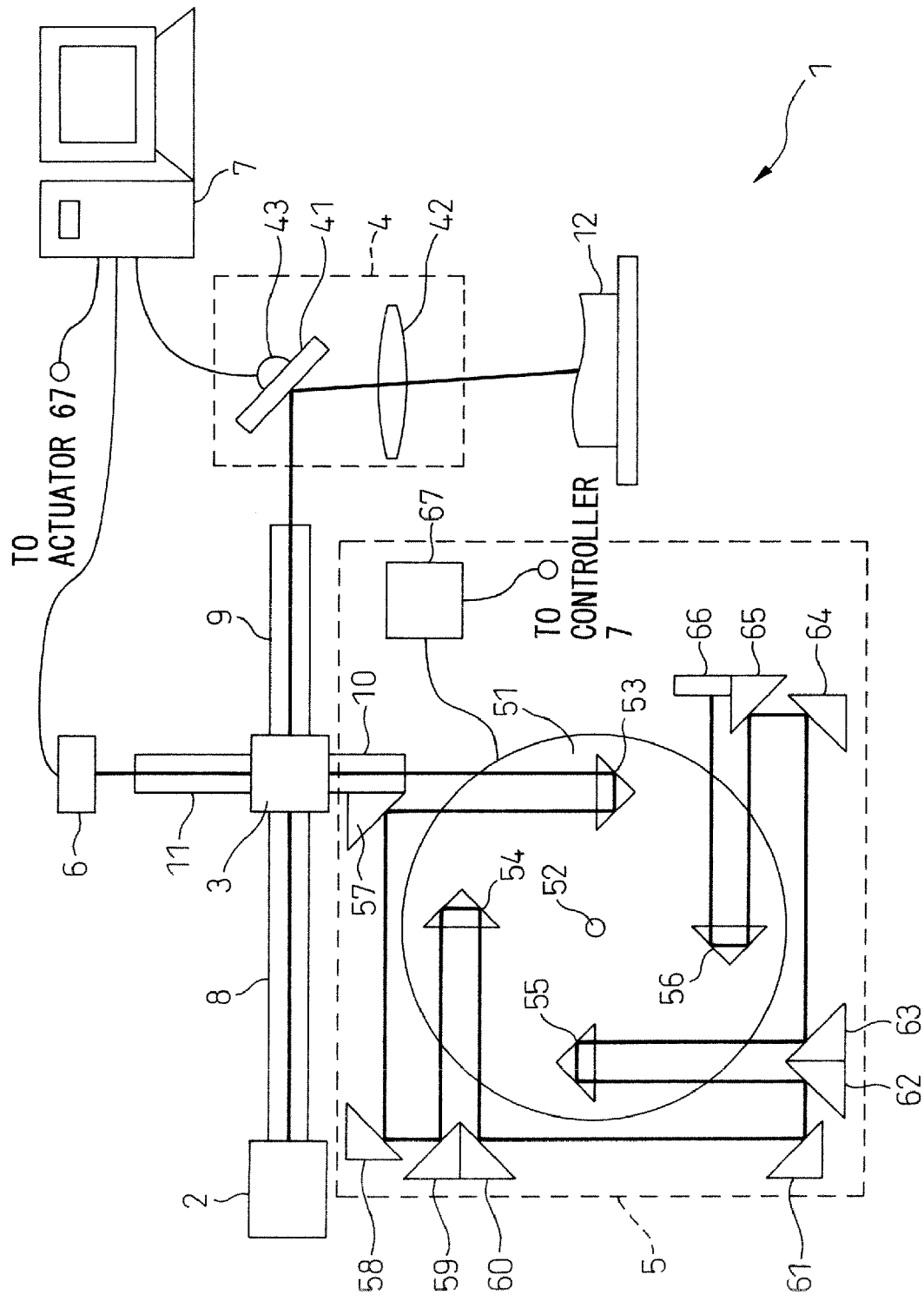
FIG. 1 illustrates a schematic diagram of a dimension measuring apparatus according to an embodiment of the present invention.

FIG. 1 illustrates a schematic diagram of dimension measuring apparatus 1 according to the present invention. The dimension measuring apparatus 1 includes a white light source 2, an optical coupler 3, an object scanning optics 4, a reference light scanning optics 5, a detector 6, a controller 7 and optical fibers 8-11.

In the dimension measuring apparatus 1, white light emitted from the white light source 2 is transmitted via the optical fiber 8 to the optical coupler 3. Then, the white light is split by the optical coupler 3 into a measurement light flux directed to the object 12 to be measured and a reference light flux directed to the reference light scanning optics 5. The measurement light flux passes through the optical fiber 9, and then is focused onto a measurement point on the surface of the object 12 by the object scanning optics 4. The measurement light flux which is reflected or scattered from the measurement point on the surface of the object 12 passes through the object scanning optics 4 and the optical fiber 9, and after that, the measurement light flux enters into the optical coupler 3 again. On the other hand, after the reference light flux passes through the optical fiber 10, the reference light flux is incident on the reference light scanning optics 5 having optical path length which can be adjusted within a predetermined range. After that, the reference light flux passes through the reference light scanning optics 5, and the reference light flux again passes through the optical fiber 10 in order to be incident on the optical coupler 3. The measurement light flux and the reference light flux are combined by the optical coupler 3 into one light beam, and the light beam is incident via the optical fiber 11 on the detector 6. The detector 6 detects white light interference fringes produced when the optical path length of the measurement light flux is substantially equal to the optical path length of the reference light flux, and converts the white light interference fringes into electrical signal, and transmits the signal to the controller 7. The controller 7 determines the optical path length of the reference light flux when the amplitude of the white light interference fringes is a maximum. The controller 7 calculates the difference between this optical path length and the optical path length of the reference light flux relative to a reference surface of a standard having a height known in advance, and thereby determines the height of the measurement point on the surface of the object.

Each component of the dimension measuring apparatus 1 will be described in detail below.

The white light source 2 is a light source capable of emitting light having a short coherence length and a broadband of wavelength. For example, a LED, a SLD (Superluminescent Diode), a SOA (Semiconductor Optical Amplifier) light sources or an ASE (Amplified Spontaneous Emission) light source may be employed as the white light source 2. The center wavelength of light emitted from the white light source 2 may be set, for example, to 750 nm, 1300 nm, or 1550 nm. In the present embodiment, a SLD light source having the center wavelength of 1550 nm is used as the white light source 2.

The optical coupler 3 splits the incident white light from the optical fiber 8 into a measurement light flux to direct to the optical fiber 9 and a reference light flux to direct to the optical fiber 10. On the other hand, the optical coupler 3 combines the measurement light flux entering from the optical fiber 9 and the reference light flux from the optical fiber 10 into one light beam and emits the light beam to the optical fiber 11. Various optical coupler known to have such function may be employed as the optical coupler 3.

The object scanning optics 4 focuses the measurement light flux exiting from the optical fiber 9 onto an arbitrary measurement point on the surface of the object 12. The object scanning optics 4 collimates the measurement light flux which is reflected or scattered from the measurement point, and makes it enter again into the optical fiber 9. For this purpose, the object scanning optics 4 includes a scanning mirror 41, a collimating optics 42, and an actuator 43.

The scanning mirror 41 is disposed adjacent to the end face of the optical fiber 9. The scanning mirror 41 is held rotatably along a plane substantially parallel to the surface of the object 12 and along a plane substantially perpendicular to the surface of the object 12 and parallel to the measurement light flux exiting from the optical fiber 9, respectively, and the orientation of the reflecting surface of the scanning mirror can be adjusted. By adjusting the orientation of the reflecting surface, the scanning mirror 41 can scan the surface of the object 12 in two dimensions with the measurement light flux.

The collimating optics 42 is disposed between the scanning mirror 41 and the object 12 to focus the measurement light flux onto or near the surface of the object 12. Thus, the area of the spot to which the measurement light flux is focused on the object 12 becomes small, and resolution of the dimension measuring apparatus 1 is thereby improved. The collimating optics 4 also collimates the measurement light flux reflected or scattered from the spot and makes it enter via the scanning mirror 41 into the optical fiber 9.

The actuator 43 adjusts the orientation of the reflecting surface of the scanning mirror 41 in accordance with the control signal received from the controller 7.

The reference light scanning optics 5 is configured such that after the reference light flux which exits from the optical fiber 10, passes through a predetermined optical path, the reference light flux again enters into the optical fiber 10. The reference light scanning optics 5 changes the length of the optical path to adjust the difference between the optical path length of the measurement light flux and the optical path length of the reference light flux. For this purpose, the reference light scanning optics 5 includes a rotary table 51, four corner cube prisms 53-56 disposed on the rotary table 51, fixed mirrors 57-66 disposed around the rotary table, and an actuator 67.

The rotary table 51 is configured to be rotatable about the rotation axis 52. During the measurement operation, the actuator 67 drives the rotary table 51 to rotate at a constant rotational speed. The rotary table 51 rotates during the measurement operation, for example, at a speed of 6000 rpm.

The four corner cube prisms 53-56 are disposed on the rotary table 51 at equal distance from the rotation axis 52 and at equal separation from each other. Specifically, the corner cube prisms 53 and 55 are disposed on the rotary table 51 to be symmetrical to each other with respect to the rotation axis 52. Similarly, the corner cube prisms 54 and 56 are also disposed on the rotary table 51 to be symmetrical to each other with respect to the rotation axis 52. The angle formed by planes parallel to the incident planes of mutually adjoining corner cube prisms is a right angle. The incident plane of each corner cube prism is arranged such that it is opposed to the end face of the optical fiber 10 and the reference light flux which exits from the end face is incident on the corner cube prism, when the corner cube prism positions on the right side of the rotary table 51.

The fixed mirrors 57-66 are disposed so as to surround the rotary table 51. Each of the fixed mirrors 57-66 functions as light beam deflecting members for changing the direction of the reference light flux exiting from a corner cube prism. When the reference light flux exiting from the optical fiber 10 is incident on any one of the corner cube prisms, one of the fixed mirrors 57-66 changes the direction of the reference light flux exiting from the certain corner cube prism so as to make it be incident on the corner cube prism adjacent to the certain corner cube prism. Thus, the reference light flux is incident in parallel and opposite direction to each other on two corner cube prisms disposed to be symmetrical to each other with respect to the rotation axis 52. Therefore, when the position of the rotation axis 52 of the rotary table 51 is shifted, the distance from one of the two corner cube prisms to the fixed mirror disposed in opposition thereto is increased by an amount corresponding to the shift. However, on the contrary, the distance from the other of the two corner cube prisms to the fixed mirror disposed in opposition thereto is decreased by the same amount corresponding to the shift. Thus, even if the position of the rotation axis 52 is shifted, the optical path length of the reference light flux itself remains unchanged.

As an example, as illustrated in FIG. 1, the propagating path of the reference light flux when the corner cube prism 53 positions in opposition to the end face of the optical fiber 10 and the reference light flux exiting from the optical fiber 10 is incident on the corner cube prism 53, will be explained below.

After the reference light flux exits from the optical fiber 10, the reference light flux is incident on the corner cube prism 53. The reference light flux is reflected from the corner cube prism 53 along the direction parallel and opposite to the incident direction. Then, the reference light flux is reflected by the fixed mirror 57 along the direction orthogonal to the incident direction, and is directed to the fixed mirror 58. Thereafter, the reference light flux is reflected successively by the fixed mirrors 58 and 59 along the direction orthogonal to the incident direction, and is directed to the corner cube prism 54. Upon incidence on the corner cube prism 54, the reference light flux is reflected from the corner cube prism 54 along the direction parallel and opposite to the incident direction, and is directed to the fixed mirror 60. Then the reference light flux is reflected successively by the fixed mirrors 60-62 along the direction orthogonal to the incident direction, respectively. Thus, the propagating direction is rotated anticlockwise by 270 degrees. Then, the reference light flux is directed to the corner cube prism 55. The reference light flux is reflected from the corner cube prism 55 along the direction parallel and opposite to the incident direction, and is directed to the fixed mirror 63. Then the reference light flux is reflected successively by the fixed mirrors 63-65 along the direction orthogonal to the incident direction, respectively, and the propagating direction is rotated anticlockwise by 270 degrees. Thereafter, the reference light flux is directed to the corner cube prism 56. The reference light flux is reflected from the corner cube prism 56 along the direction parallel and opposite to the incident direction, and is directed to the fixed mirror 66. Since the reference light flux is incident vertically to the fixed mirror 66, after the reference light flux is reflected by the fixed mirror 66, the reference light flux propagates in the same optical path as it has propagated, but in reverse direction. Thus, after the reference light flux is again reflected by the corner cube prisms 53-56 and the fixed mirrors 57-65, the reference light flux exits from the reference light scanning optics 5 so as to be incident on the optical fiber 10.

Here, it is assumed, for example, that the position of the rotation axis 52 is shifted by distance a along the direction closing to the optical fiber 10. In this case, length of the optical path from the end face of the optical fiber 10 via the corner cube prism 53 to the fixed mirror 57 is shorter by 2a than the length of the same optical path when the position of the rotation axis 52 is not shifted. However, as described above, the corner cube prism 55 is disposed to be symmetrical to the corner cube prism 53 with respect to the rotation axis 52, and the incident direction of the reference light flux which enters to the corner cube prism 53, is parallel and opposite to the incident direction of the reference light flux which enters to the corner cube prism 55. Therefore, the length of the optical path from the fixed mirror 62 via the corner cube prism 55 to the fixed mirror 63 is longer by 2a than the length of the same optical path when the position of the rotation axis 52 is not shifted. Thus, it is understood that, even if the position of the rotation axis 52 is shifted, the changes of the optical path length between the corner cube prisms 53 and 55 and the fixed mirrors disposed in opposition thereto cancel each other.

Next, it is assumed that the position of the rotation axis 52 is shifted by distance b along the direction closing to the optical fiber 10 and perpendicular to the direction of propagation of the reference light flux which exits from the optical fiber 10. In this case, length of the optical path from the fixed mirror 59 via the corner cube prism 54 to the fixed mirror 60 is longer by 2b than the length of the same optical path when the position of the rotation axis 52 is not shifted. However, as described above, the corner cube prism 56 is disposed to be symmetrical to the corner cube prism 54 with respect to the rotation axis 52, and the incident direction of the reference light flux which enters to the corner cube prism 54, is parallel and opposite to the incident direction of the reference light flux entering to the corner cube prism 56. Therefore, the length of the optical path from the fixed mirror 65 via the corner cube prism 56 to the fixed mirror 66 is shorter by 2b than the length of the same optical path when the position of the rotation axis 52 is not shifted. Thus, it is understood that, even if the position of the rotation axis 52 is shifted, the changes of the optical path length between the corner cube prisms 54 and 56 and the fixed mirrors disposed in opposition thereto cancel each other.

As has been described above, even if the position of the rotation axis 52 is shifted either along the direction parallel to or along the direction orthogonal to the propagating direction of the reference light flux which exits from the optical fiber 10, the changes of the optical path length between two corner cube prisms disposed to be symmetrical to each other with respect to the rotation axis 52 and the fixed mirrors disposed in opposition thereto cancel each other. Therefore, it is understood that overall length of the optical path of the reference light flux remains unchanged.

On the other hand, when the distance between the end face of the optical fiber 10 and the corner cube prism disposed in opposition to the end face changes due to rotation of the rotary table 51, the distance variation between other corner cube prisms and the fixed mirrors disposed in opposition thereto are the same as those between the end face of the optical fiber 10 and the corner cube prism disposed in opposition to the end face. For example, in FIG. 1, it is assumed that the distance between the corner cube 53 and the end face of the optical fiber 10 increases by c due to rotation of the rotary table 51. In this case, the distance between each corner cube prism and the fixed mirror disposed in opposition thereto (for example, between the corner cube 54 and the fixed mirrors 59, 60) also increases by c, so that overall optical path length of the reference light flux increase by 8c. In this way, by rotating the rotary table 51, the reference light scanning optics 5 can widely change the optical path length of the reference light flux by eight times the displacement of the corner cube prism.

The actuator 67 actuates the rotary table 51 in accordance with control signal from the controller 7. For this purpose, the actuator 67 can utilize various known types of motors, although it is preferable that the rotary table 51 can rotate at a constant rotational speed (for example, 6000 rpm) during the measurement operation. Also, preferably, the actuator 67 can change the rotational speed of the rotary table 51 depending on applications. Thus, it is preferred that the actuator 67 employs a motor having small speed variation ratio (for example, speed variation ratio of 0.01% or less) at plural rotational speed settings.

The detector 6 outputs the detected light intensity as an electric signal. As the detector, a semiconductor detector element such as a photodiode, a CCD, or a C-MOS may be employed. In the present embodiment, a two-dimensional array of CCD elements is used. The detector 6 performs sampling of the detected light intensity at a predetermined time interval, and converts the detected light intensity at each sampling point as an electric signal. Further, the detector 6 is electrically connected to the controller 7, and successively transmits the electric signal to the controller 7.

Here, when white light interference is produced between the reference light flux and the measurement light flux, the optical path difference between these light fluxes changes in accordance with the movement of the corner cube prisms, and the corresponding electric signal also changes in accordance with the change of light intensity due to the change of the optical path difference. Since the position of the corner cube prism changes with rotation of the rotary table, the position also changes in time. Thus, the white light interference is observed as temporal variation of the electric signal outputted from the detector 6.

The optical fibers 8-11 are respectively disposed between the optical coupler 3, the white light source 2, the object scanning optics 4, the reference light scanning optics 5 and the detector 6 in order to transmit the light flux between components. As the optical fibers 8-11, various known optical fibers may be employed. However, it is preferable that transmission loss of the optical fibers 8-11 for the wavelength of light emitted from the white light source 2 is as small as possible.

The controller 7 may be a so-called PC, and includes a processor device such as a CPU, a storage device including semiconductor memories such as a ROM, a RAM, or a magnetic disk, or an optical disk and a reading device of the disks, a communication device including electronic circuits configured in accordance with communication standard such as RS232C, Ethernet™ and softwares such as device drivers, and computer programs stored in the storage device and executed on CPU.

The controller 7 determines the height of the measurement point of the object 12 by measuring the optical path length of the reference light flux based on the light intensity detected by the detector 6. The controller 7 is electrically connected to various parts of the dimension measuring apparatus 1 and controls them.

Here, in order to measure the optical path length of the reference light flux, the controller 7 determines the positions of the corner cube prisms when the electric signal indicating white light interference fringe is obtained from the detector 6. When the rotary table 51 of the reference light scanning optics 5 rotates, it may happen that the reference light flux does not reach the detector 6 depending on the positions of the corner cube prisms. In other words, only when the reference light flux which exits from the optical fiber 10, enters into an incident surface of any one of the corner cube prisms, the reference light flux reaches the detector 6. Light intensity at the detector 6 is much larger when the reference light flux is received than when the reference light flux is not received by the detector 6. Therefore, electric signal corresponding to light intensity transmitted from the detector 6 to the controller 7 is also much larger when the reference light flux is received than when the reference light flux is not received. Thus, the controller 7 estimates the position of the corner cube prism by measuring temporal variation of the electric signal corresponding to the light intensity received from the detector 6, and thereby determines the optical path length of the reference light flux.

First, when the reference light flux can enter into an incident surface of any one of the corner cube prisms, the position p1 of the corner cube prism closest to the optical fiber 10 and the position p2 farthest from the optical fiber 10 are measured in advance, and these positions are stored in the storage device of the controller 7.

On the other hand, during the measuring operation, in FIG. 1, for example, it is assumed that the rotary table 51 rotates clockwise. In this case, the controller 7 detects, for example, the time t1 when the electric signal increases and the variation of the electric signal per unit of time exceeds a predetermined threshold value, and, after the time t1, the controller 7 detects the time t2 when the electric signal decreases and the variation of the electric signal per unit of time exceeds the predetermined threshold value. In order not to detect the signal variation due to white light interference, the controller 7 may add to the conditions for detection of the time t1 and the time t2, the requirements that the mean value of the electric signal for a certain time period before the time t1 and for a certain time period after the time t2 will be less than a predetermined value.

The controller 7 can determine that the detector 6 is receiving the reference light flux during time t1 and time t2. Thus, the controller 7 can estimate that, at time t1, any one of the corner cube prisms is at position p1, and at time t2, the same corner cube prism is at position p2. The position of the corner cube prism at any time t between time t1 and time t2 can be determined as follows. First, the controller 7 calculates ratio r ($=(t-t1)/(t2-t1)$) of the time difference between t and t1 to the time difference between t2 and t1. Then, the controller 7 multiplies the ratio r to the rotation angle $\alpha$ from position p1 to position p2 to obtain the angle $\beta$ in which the corner cube prism has been rotated from time t1 to time t as $\beta = \alpha \cdot r$. Finally, the controller 7 determines the position reached by clockwise rotation of angle $\beta$ from position p1 as the position of the corner cube prism at time t. By determining the position of the corner cube prism, the controller 7 can determine the optical path length of the reference light flux based on the position.

Further, the controller 7 determines the surface height of the object based on the white light interference fringe that is produced depending on the difference between the optical path lengths of the reference light flux and the measurement light flux.

Since light emitted from the white light source 2 has a short coherence length, the white light interference fringe can be observed by the detector 6 only if the optical path length of the measurement light flux is substantially equal to the optical path length of the reference light flux. When the optical path lengths of two light fluxes coincide, the amplitude of the white light interference becomes a maximum. Therefore, the controller 7 determines the position of corner cube prisms at which the amplitude of white light interference is a maximum for a reference surface of a standard having known surface height and for a measurement point of the object, respectively. The controller 7 determines the difference between the positions, and by adding the difference of the optical path length to the surface height of the reference surface, the controller 7 determines the surface height of the measurement point of the object.

In order to accurately determine the time when the amplitude of the white light interference fringe becomes a maximum, the controller 7 may perform low-pass filtering on the electric signal received from the detector 6 to remove the high frequency component corresponding to the period of the white light interference fringes, and to obtain an envelope of the electric signal. The controller 7 may determine the time when the amplitude of the envelope is maximum as the time when the amplitude of the white light interference is maximum.

Figure 2:
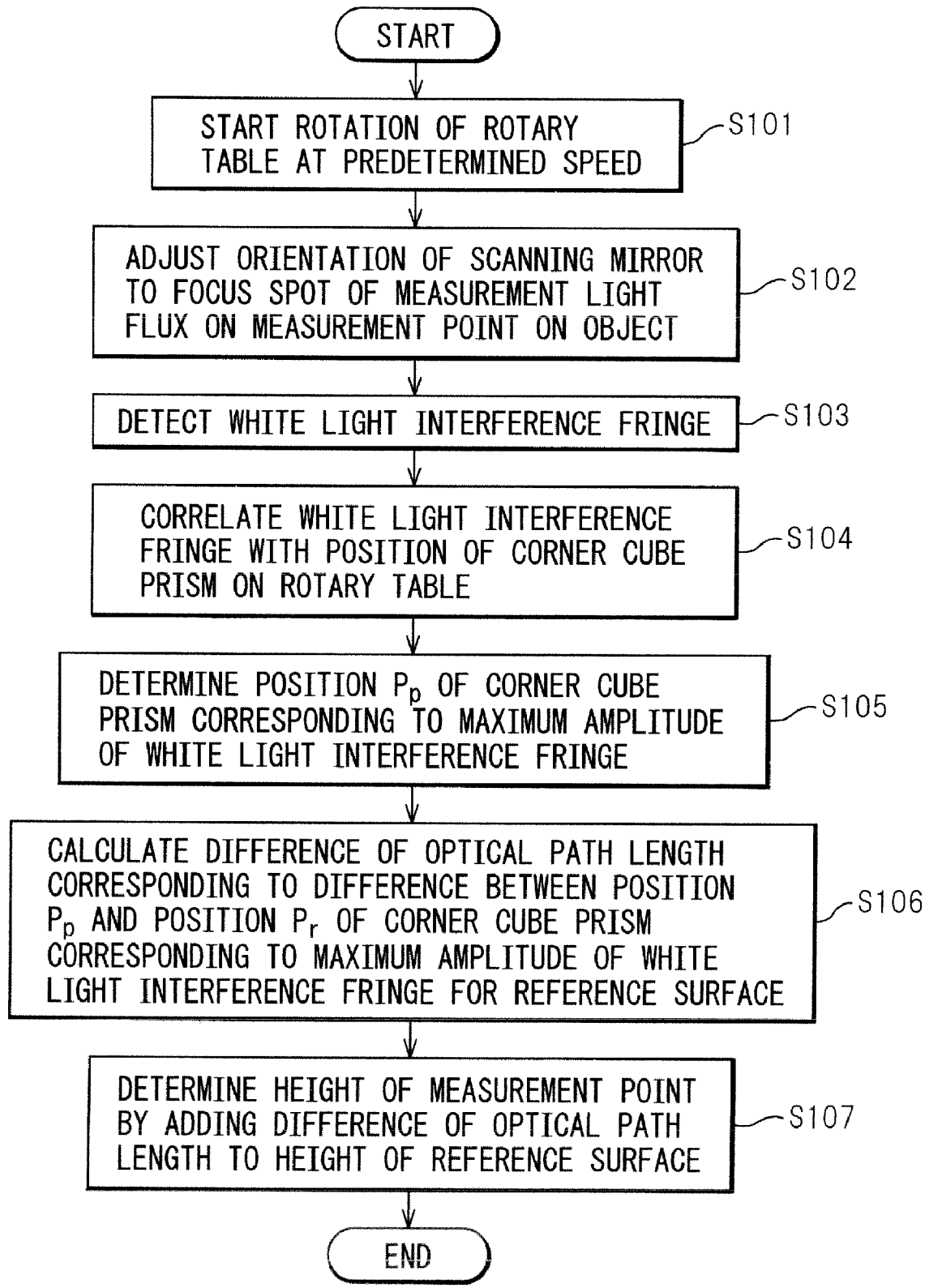
FIG. 2 illustrates a flow chart of the operation of the dimension measuring apparatus when the apparatus is used for measuring surface height at an arbitrary measurement point on the surface of an object.

FIG. 2 illustrates a flow chart of the operation of the dimension measuring apparatus 1 during performing measurement of the surface height of the object 12. The operation is controlled by the controller 7.

As a preliminary step, the above-mentioned standard is placed on the dimension measuring apparatus 1, and by irradiating the standard with the measurement light flux, the position Pr of the corner cube prism corresponding to the maximum value of the white light interference fringe is determined. The position Pr is stored in the storage device of the controller 7.

When the controller 7 starts measurement operation, it controls the actuator 67 of the reference light scanning optics 5 to rotate the rotary table 51 at a predetermined speed (step S101). Next, the controller 7 controls the actuator 43 of the object scanning optics 4 to adjust the orientation of the scanning mirror 41 such that the measurement light flux is focused to a spot on an arbitrary point of the object 12 (step S102). Then, the controller 7 controls the detector 6 to detect the white light interference fringe produced depending on the difference between the optical path length of the measurement light flux and the optical path length of the reference light flux (step S103). The detector 6 transmits the electric signal corresponding to the white light interference fringe to the controller 7.

Next, the controller 7 determines the relation between the electric signal received from the detector 6 and the position of the corner cube prism (step S104). As has been described above, the controller 7 detects, for example, the time when the electric signal changes abruptly, and by correlating the time with the limit position of the corner cube prism that permits the reference light flux to be received by the detector 6, it can determine the relation of the electric signal and the position of the corner cube prism. The controller 7 measures the time when amplitude of periodic oscillation of the electric signal is maximum, that is, the time tp at which amplitude of the white light interference fringe is maximum, and determines the position Pp of the corner cube prism at this time (step S105). Then, the controller 7 determines, based on the difference between the position Pp of the corner cube prism determined at step S105 and the position Pr of the corner cube prism determined similarly for the reference surface, the difference of the optical path length corresponding to the difference between positions Pp and Pr (step S106). The controller 7 adds the difference of the optical path length to the surface height of the reference surface, and thereby determines the surface height of the object 12 at the measurement position (step S107).

The controller 7 can repeat the processing at steps S101-S107 as described above, and measure the surface height at various points on the surface of the object 12.

As has been described above, the dimension measuring apparatus according to an embodiment of the present invention can change the optical path length of the reference light flux widely in a short time by rotating the rotary table having a plurality of corner cube prisms mounted thereon for determining the optical path of the reference light flux. Therefore, the dimension measuring apparatus according to the present invention can secure a wide measurement range and perform measurement in a short time. The plurality of corner cube prisms are disposed on the rotary table to be symmetrical with respect to the rotation axis, and fixed mirrors are disposed such that the reference light flux is incident on respective corner cube prisms disposed to be symmetrical to each other in parallel and opposite direction. Therefore, the dimension measuring apparatus can compensate for the change of optical path length of the reference light flux due to the positional shift of the rotation axis. Thus, this dimension measuring apparatus can measure the surface height of the object in high precision.

The present invention is not limited to the above-described embodiment. For example, in the reference light scanning optics, in place of the corner cube prisms, corner cube mirrors, right angle prisms or two mirrors having reflecting surface at right angle to each other may be used. The number of corner cube prisms is not limited to four. For example, number of corner cube prisms may be two. In such case, the corner cube prisms also are disposed on the rotary table to be symmetrical to each other with respect to the rotation axis. Even when only two corner cube prisms are used, the dimension measuring apparatus according to an embodiment of the present invention can prevent variation of optical path length of the reference light flux due to positional shift of the rotation axis along the direction of the reference light flux exiting from the optical fiber.

Also in place of the fixed mirrors 57-66, waveguides may be used as light beam deflecting members. The waveguides deflect the reference light flux exiting from each corner cube prism to make it be incident on the adjacent corner cube prism. In this case, the waveguides also are configured such that the directions of the reference light flux which is incident on two corner cube prisms disposed to be symmetrical to each other with respect to the rotation axis of the rotary table, are parallel and opposite to each other.

A mechanism for detecting that the corner cube prisms have reached a predetermined position may be provided separately to the reference light scanning optics 5 in order to accurately correspond the positions of the corner cube prisms to the electric signal corresponding to the light intensity detected by the detector. For example, a through-hole may be formed at a predetermined position on the rotary table 51 so as to penetrate the rotary table 51 along the rotation axis, and a light source such as a LED and a light receiving sensor in opposition to the light source may be provided so as to place the rotary table 51 in between. This mechanism is configured such that, when the through-hole formed in the rotary table 51 reaches the predetermined position, light from the light source reaches the light receiving sensor. When the light receiving sensor detects the light from the light source, it transmits detection signal to the controller 7. The controller 7 can assign the time when it receives detection signal from the detector to the electric signal corresponding to the light intensity at that time, and thereby can establish correspondence of the position of the corner cube prism to the electric signal.

As has been described above, those skilled in the art can make various modifications to the embodiment without departing from the scope of the present invention.

What is claimed is:

1. A dimension measuring apparatus for measuring surface height of an object comprising:
    a white light source;
    a light beam splitting element for splitting light emitted from said white light source into a measuring light flux having an optical path length depending on said surface height of the object and a reference light flux;
    reference light scanning optics for varying the optical path length of said reference light flux exiting from said light beam splitting element;
    a detector for detecting an interference signal produced when said optical path length of the measurement light flux and said optical path length of the reference light flux are substantially equal, and outputting a signal corresponding to the interference signal; and
    a controller for determining the surface height of the object by determining said optical path length of the reference light flux corresponding to a maximum value of said interference signal;
    wherein said reference light scanning optics comprises:
    a rotary member;
    a driver for rotating said rotary member at a predetermined rotational speed;
    a first reflective element and a second reflective element disposed on said rotary member to be symmetrical to each other with respect to the rotation axis of said rotary member; and
    light beam deflecting members for directing said reference light flux such that, when said reference light flux is incident on one of said first or second reflective elements, the reference light flux reflected from the one of the first or second reflective elements is incident on the other of said first or second reflective elements along a direction parallel and opposite to an incident direction of said reference light flux on said one of the first or second reflective elements; and wherein
    said reference light scanning optics varies said optical path length of the reference light flux by rotating said rotary member.

2. The dimension measuring apparatus as claimed in claim 1, wherein said reference light scanning optics further comprises a third reflective element and a fourth reflective element disposed on said rotary member to be symmetrical to each other with respect to the rotation axis of said rotary member; and wherein
    said reflective elements are disposed at equal intervals to each other and at equal distances from the said rotation axis, and said light deflecting members direct said reference light flux such that, when said reference light is incident on said one of the first or second reflective elements, the reference light flux reflected from said one of the first or second reflective elements is incident on one of said third or fourth reflective elements and the reference light flux is incident on the other of said third or fourth reflective elements along a direction parallel and opposite to an incident direction of said reference light flux on said one of said third or fourth reflective elements.

* * * * *